United States Patent [19]

Pai

[11] Patent Number: 4,861,985

[45] Date of Patent: Aug. 29, 1989

[54] TIME-AVERAGED RADON DAUGHTERS (WL) DOSIMETER AND METHOD FOR SURVEYS OF INDOOR, OUTDOOR AND UNDERGROUND (MINE) CONTAMINATION

[76] Inventor: Hsiang L. Pai, 50 Silver Star Blvd. Unit 208, Scarborough, Ontario M1V 3L3, Canada

[21] Appl. No.: 92,954

[22] Filed: Sep. 4, 1987

Related U.S. Application Data

[63] Continuation-in-part of Ser. No. 849,551, Apr. 8, 1986, abandoned.

[51] Int. Cl.$^4$ .......................... G01V 5/00; G01T 5/00
[52] U.S. Cl. .................................... 250/253; 250/255; 250/472.1; 250/482.1
[58] Field of Search ...................... 250/253, 255, 370.2, 250/393, 472.1, 482.1, 505.1, 515.1

[56] References Cited

U.S. PATENT DOCUMENTS

| | | | |
|---|---|---|---|
| 3,505,523 | 4/1970 | Becker | 250/473.1 |
| 3,922,555 | 11/1975 | Chapuis et al. | 250/472.1 |
| 4,055,762 | 10/1977 | Durkin | 250/253 |
| 4,385,236 | 5/1983 | Hassib et al. | 250/472.1 |
| 4,607,165 | 8/1986 | Burghoffer et al. | 250/435 |
| 4,700,067 | 10/1987 | Carossi et al. | 250/380 |
| 4,704,537 | 11/1987 | Urban et al. | 250/472.1 |

Primary Examiner—Janice A. Howell
Assistant Examiner—Constantine Hannaher

[57] ABSTRACT

An instrument and method for selectively detecting alpha particles emitted simultaneously by radium A and radium C' which are derived from radon includes a device for sampling air through a filter which retains the alpha-emitting aerosols, a detector preferably CR 39, in which the alpha particles corresponding to the respective energies of the alpha emissions of radium A and of radium C' are selectively using the track diameter discrimination method. Either a single or a multiple collimator system can be adopted. Collimators are composed of simple parts allowing the flexible adjustment of the geometric efficiency. If a multiple collimator is adopted, it will provide advantage of reducing the volume while improving the overall efficiency. An appropriate thickness can be chosen for the absorber attached to the collimator so that the energy difference between alphas from RaA and RaC' can be enhanced. This enhancement will contribute to the resolution for separating RaA and RaC' by using an ordinary image analysis system.

40 Claims, 4 Drawing Sheets

$$SR = \frac{R(HT-H)}{H} = .715$$

$$SR = SA + 2R + D$$
$$= \frac{R(HT-H)}{H} + 2R + D$$
$$= .203 + .226 + .05$$
$$= .48$$

TIME-AVERAGED RADON DAUGHTERS (WL) DOSIMETER AND METHOD FOR SURVEYS OF INDOOR, OUTDOOR AND UNDERGROUND (MINE) CONTAMINATION

RELATED APPLICATION

The present application is a continuation-in-part of U.S. patent application Ser. No. 849,551 which was filed Apr. 8, 1986 abandoned by the same sole inventor.

FIELD OF THE INVENTION

This invention relates to a radon daughter working level dosimeter for survey of indoor, outdoor and mine atmospheres, particularly to a dosimeter that can separately detect RaA (Po-218) and RaC' (Po-214).

BACKGROUND OF THE INVENTION

Radon (Rn-222) is a naturally occurring radioactive gas. It is produced by decay of radium (Ra-226) part of the decay chain of uranium which occurs throughout the earth's crust. The short-lived decay products of radon, called radon daughters, in air, attach themselves to aerosols, and if inhaled are partly deposited in human respiratory tract. The radiation dose caused by inhalation of radon daughters in air constitutes in many countries the major part of the natural radiation dose to man. The radiation dose caused by radon itself is minor in comparison with that of the radon daughters.

The levels are normally higher indoors than outdoors, and in uranium mines the levels may be very high. Even in the outdoor air, the man modified levels and releases may under certain circumstances be much higher than normal. The fluctuations in air make the measurement result both time and space dependent. The fluctuation of the radon daughters will be expected to be more pronounced because it is subject both to the variation of source (radon) and the aerosol conditions. For the safety of human beings, the monitoring of radon daughters indoors, in mines and in the environment is becoming increasingly important. Since the estimated risk to human beings is based upon the time averaged value of the radon daughters, a time-averaged dosimeter is ideally required. Because the level of the radon daughters is highly space dependent, whether within dwellings or in mines it is advisable to make a large number of measurements. As a consequence, dosimeters for measuring radon daughters should be simple, accurate, capable of rapid processing, and inexpensive.

Radon or radon daughters instruments are either active (with a sampling pump) or passive (without a pump). With due attention to experimental calibration, radon levels can be measured to a reasonable degree of accuracy using passive devices. Radon daughters measurement, logically favors an active device for the following reasons:

(1) The air sampler will determine how many liters of air are sampled so that a time-averaged value of radon daughters per liter can accurately be obtained. The possibility of plate-out contamination which usually affects the passive device can easily be eliminated in the active system.

(2) Radon daughters in air presents a three-dimensional source. If alpha detection is used for the passive measurement of the radon daughters, a plane detector (either solid state track or TLD detector) is usually employed. Depending upon the geometry of the detector and the alpha source, a wide range of alpha energies and incident angles will be registered. The alpha energies at the detector vary greatly because of the energy losses along the varying path lengths in air due in turn to the three dimensional source condition. In order to achieve the required precision, a fairly complicated processing method is usually required. However, in the case of the active device, the sampler can be considered as a means of converting a three dimensional source distribution in air into a plane source on filter paper. For dosimetric purposes, it is far easier to interpret the detector tracks resulting from this method, since, with a plane source and a plane detector the alphas appear mono-energetic. It is especially important if an image analysis system is used for automatic readout of the tracks. Pattern recognition by the image analysis system is sensitive to both the angle of incidence and the residual energy of alphas.

(3) Another favorable condition for the active device is that the theoretical efficiency can be estimated more accurately. This makes the quality assurance more precisely controlled than in the passive device which depends primarily upon experimental calibrations. For dosimetric purposes, radon daughters are measured in terms of the working level (WL) unit, which can be expressed as:

$$WL\ Rn - 222 = \frac{6\ RA + 7.68\ RC}{1.3 \times 10^5\ (E)\ (V)}\ \text{where,}$$

RA = number of tracks for RaA
RC = number of tracks for RaC'
E = alpha counting efficiency (tracks/disintegration)
V liter of air drawn through the filter (1/hr × hrs).

Under the condition that every alpha from the source (the filter paper) is detected as a readable track after striking the detector, the geometric efficiency can be adopted without further experimental calibrations.

For indoor radon measurement, there is no special requirement for the differentiation of RaC' from RaA. Instead, most of the current continuous or time integrated instruments adopt the "total alphas" method, in which all alpha tracks are counted without regard to the various energies. This method is acceptable because the total alphas method can only introduce an uncertainty of less than 6%, as compared with the true value from the definition mentioned above. This error is not significant for dosimetric purposes.

For personal mine dosimeters, the simpler total alpha method cannot be used. This is because the ratio of RaA/RaC' under the dusty atmosphere of the mine, is related to the time-averaged ventilation conditions, and can vary quite widely depending upon the region in which an individual miner is working. This is an important consideration in assessing the risks to the miner. If the differentiation of RaA from RaC' is required for dosimetric purposes, the active device is much more practical than the passive one. Although careful analysis of tracks registered by the passive device allows differentiation of the different alpha emitters according to the residual energy, this involves complicated processes which are inconvenient for the dosimetry uses. Due to the three-dimensional nature of the source condition for the passive device, random-oriented tracks are always expected even if a collimator device is adopted. If the range of the individual random-oriented track is used for deducing the residual energy, this usually requires the measurement of 5 parameters under a microscope.

One successful active device (CEA U.S. Pat. No. 3,922,555) makes use of Kodak Pathe LR-115 Type II nitrocellulose film, as the alpha detector LR-115 Type II is what is known as a band-pass detector. Its response to alphas is such that the diameter of the transparent track after processing is a maximum for perpendicular incident/alphas with a residual energy of around 3 MeV, while the diameter of the track drops sharply for alphas of residual energy higher than 3 MeV. For tracks caused by oblique incident alphas, the drop in the diameter is also sharp as compared with the perpendicular tracks. With this prior art device, by carefully selecting the thickness of an absorber fixed at the top of a collimator, the tracks of only one kind of radon daughter can be expected in the region of the detector defined by that particular collimator and absorber For instance, by choosing an absorber with a thickness which will degrade the residual energies from alphas from RaA (6 MeV) to around 3 MeV, only tracks, from RaA will be expected in the region defined by the collimator fitted with that particular absorber, residual energies from alphas of RaC' (7.68 MeV) will be too high to produce a readable track after passing through the same absorber. Similarly by using a different thickness of absorber which will degrade the alpha energy from RaC' down to 3 MeV while degrading that of RaA to zero, the region defined by the collimator fitted with this particular absorber will reveal the track of RaC' only. Therefore, the separate detection of RaA and RaC' described by the CEA patent is an ingenious use of the band-pass characteristics of the LR-115 Type II detector However, the CEA prior art device will not work with any detector other than the Kodak Pathe LR-115 Type II nitrocellulose detector. Another characteristic of the device of the CEA Patent is that there must be at least two collimators in order to selectively detect two alpha particles, as may be gleaned from the above description.

The detecting device described by the CEA patent was originally designed as a personal dosimeter for uranium miners. It was found later that it could be adapted for environmental and indoor radon daughters measurements. Years of field testing experience have revealed the following problems:

(1) Two problems have been encountered regarding the uranium mine personal dosimeter:

(a) Technical difficulty in reducing the volume of the detecting head.

Miners usually carry their headlights and the necessary tools all the way to their workplace. To limit the number and the volume of the articles carried by the miners is a serious problem to be considered. As a consequence, uranium mine companies would prefer to mount the personal dosimeter on the top of the headlight battery. This is not possible with the prior art device of the CEA patent which is too large and must be belt-mounted as a separate unit. As is mentioned above, oblique tracks must be limited in the prior art CEA device because the tracks contributed by oblique and perpendicular incidence alphas are of quite different diameters even if the energies of the alphas are the same. Since a long collimator is needed to eliminate the oblique tracks in the CEA device, the height of the detector head cannot be reduced. Also, since RaA and RaC' are separately detected in different collimators in the CEA device, the overall cross section of the detecting head cannot be decreased either. Both factors (length and cross-section) present problems in mounting the prior art CEA dosimeter on the top of the headlight battery.

(b) Contamination of the collimator system.

The collimator system of the CEA patent is easily contaminated by the alpha-emitting uranium dust, especially in the highly dusty uranium-rich mining environments. Recent investigations reveal that alphas emitted by uranium dust (if allowed to pass to the collimator) will have the same residual energy as alphas from RaA deposited on the filter paper. A false high measurement of RaA will result.

(2) Indoor Surveys.

Normally, the purpose of an indoor survey is to estimate the annual mean WL for a given indoor environment. The so-called time-averaged instrument is designed to allow for diurnal fluctuations as well as variations introduced by the living habits of the occupants. In order to obtain a reliable mean value 10 days' continuous exposure is generally required when using the CEA patent device. Badly radon-contaminated houses present another urgent requirement for indoor radon surveys. The purpose of the survey, usually known as "screening", is to identify houses with high radon levels as quickly as possible, for remedial action or further investigation. The survey requires instruments with a minimal sampling time and therefore detecting heads designed for this purpose generally cannot be used for the longer duration time-averaged exposures previously described, as overlapping of tracks may be found. A more versatile design is needed so that the detecting geometry and hence the efficiency or sensitivity of the instrument can be changed in a simple way so that the optimum exposure time can be varied, enabling measurements to be made in from one day to ten days depending upon the requirements.

(3) Environmental Survey Use.

A high-speed battery-operated pump is needed with the prior art CEA device to compensate for the generally low level of radon in the environment. The power supply required by the high-speed pump is usually not convenient for field use. It is also expensive. To improve the detection efficiency is a logical solution. As mentioned above, the current design of the prior art CEA dosimeter is not flexible enough to allow this improvement.

Two other prior art devices, which are less pertinent than the CEA '555 patent, are briefly described below, however, a detailed analysis of this prior art will be foregone.

U.S. Pat. No. 3,505,523 to Becker shows a personal radon dosimeter worn by uranium miners. Becker discloses an active device, however, it is one which does not provide the capability of selectively detecting alpha particles from RaA and RaC', which is very important for use in a mine environment.

U.S. Pat. No. 4,055,762 to Durkin shows a portable radon daughter dosimeter unit used to measure radon gas alpha daughters in ambient air. The Durkin patent discloses an active device; however, it is a solid state electronic device, which is substantially different from the present invention.

SUMMARY OF THE INVENTION

The primary object of the present invention is to provide a design for dosimeters easily adapted for use in mines, or for indoor and outdoor surveys, and in which all the shortcomings previously described can be solved. These dosimeters can also selectively detect RaA and RaC' by means of track size. In order to overcome the problems to which the current models of dosimeters are subject, the following design features are proposed:

(1) The use of CR-39 instead of LR-115 Type II as an Alpha Detector.

CR-39 is an ordinary high-pass detector. By highpass, we mean that there is a finite probability for an alpha to leave a track in the detector so long as the residual energy of the alpha after passing through absorbers (including the air passage) is higher than zero. It is capable of distinguishing alphas from RaA and RaC' in the same region using track size differentiation. This is based upon the fact that the normal incident track diameter for alphas on CR-39 is a linear function of the residual energy. A suitable image analysis system is able to perform the energy differentiation automatically by measuring the diameters of the individual tracks another advantage of CR-39 is that the deformation of the track shape as the angle of incidence of the alphas varies from normal to oblique, is a slowly varying but precise function of the incident angle. If the total alpha method is preferred, the geometric efficiency of the detector assembly can be varied without introducing significant problems in the processing and read-out. In other words, limiting the oblique tracks as is required by the LR-115 Type II detector, and thus the CEA patent prior art device, is not necessary in the case of CR-39 detector, and thus the present invention, allowing tremendous flexibility in detector head design.

(2) Use of an Image Analysis System for Automatic Read-Out of Tracks

So far solid state track detectors are considered to be the best suited for dosimetric purposes. Although there are some obvious advantages of the track detector over the Thermo-Luminescent Dosimeter (TLD) for the dosimetry of radon and its daughters, the track detector has not been practically adopted on a large scale. In the past 15 years, the lack of an efficient automatic read-out device has been the main drawback to the use of track detectors. Recently there have been some developments published on the use of an image analysis system for the automatic read-out of tracks, but all of them are concerned with the passive device. As was mentioned in the last section, the alpha emitting source involved with an active device can be considered monoenergetic, it therefore eliminates most of the complicated modelling work required by the volume source nature of the passive device. The primary practical problem facing the active device is how to improve the resolution of the diameter measurement using an image analysis system so that RaA and RaC' can be completely resolved.

The current method achieves the required resolution by the following design.

(a) Enhancement of the energy gap between RaA and RaC'

Due to the non-linear characteristic of the range energy relation when range is close to zero, the energy gap between RaA and RaC' can be enhanced by using an appropriate absorber. For instance, Table (1) will provide an example.

TABLE I

| Alpha emitter | Alpha energy | Natural Energy gap from RaA | Energy after passing thru 2 cm air & 18 μm mylar | Enhanced energy gap from RaA | Remarks |
| --- | --- | --- | --- | --- | --- |
| RaA | 6.00 | — | 1.0 | — | Polonium-218 |
| RaC' | 7.68 | 1.68 | 4.3 | 3.3 | Polonium-214 |

The slope of the track diameter—energy curve is roughly 0.6 μm/MeV. (for 6 hours etching and using an objective magnifying power of 40). The improvement of the diameter differential between RaA and RaC' corresponding to energy gap enhancement of 1.68 MeV to 3.3 MeV is 1 μm to 2 μm.

(b) Indirect diameter determination by means of area measurement using image analysis techniques.

The image analysis method of measurement of the present invention follows an elementary process. It just finds out how many basic units (pixels) there are inside the periphery of either the area or the diameter. As a consequence, the counting statistics will be improved by performing area measurement (total pixels in an area) rather than linear measurement (total pixels along a line). Table (2) gives an example of comparison between the precision (expressed in standard deviation) of direct measurement and that derived from area measurement. It should be emphasized here that due to the homogeneity property of CR 39, only the cross section of the perpendicular track of CR 39 turns out to be a perfect circle and therefore makes the indirect diameter measurement feasible.

TABLE 2

| Alpha energy (MeV) | Direct diameter (μm) | | derived from area measurement (μm) | |
| --- | --- | --- | --- | --- |
| | mean diameter | S.D. | mean diameter | S.D. |
| 1.81 | 20.7 | 0.9 | 20.2 | 0.5 |
| 2.88 | 20.5 | 0.9 | 19.6 | 0.5 |
| 3.92 | 18.8 | 0.7 | 17.0 | 0.4 |
| 4.92 | 17.2 | 0.7 | 16.1 | 0.4 |

On average, the resolution improves by 45% using area measurement.

(3) The Multiple Collimator Concept.

Based upon the fact that RaA and RaC' can be differentiated within a single defined area of the detector, a volume reduction of the head assembly and a higher detection efficiency can both be achieved by adopting the multiple collimator concept of the present invention as described in the following paragraph.

(4) The New Spacer-Collimator System.

To meet the requirement of radon daughters dosimetry under widely differing conditions, flexibility regarding the change of detecting efficiency is mandatory. Sometimes a collimator will be necessary, sometimes not. Even if a collimator is not required to limit the angle of incidence, it may still be needed to define the detector region in use and to allow for background discrimination. The new spacer-collimator system provides a simple and inexpensive way to fulfill all the above requirements using simple parts, and thus, among other advantages, provide for the manufacture of a disposable radon dosimeter. Details of this system will be found in a later section of this application.

In order to design an all purpose active radon daughters dosimeter, the following requirements should be met. It should be simple in use, accurate for dosimetric purposes, capable of fast processing, and with a cost comparable to that of a passive device. The system should include a small size pump as well as the small detecting head which items have so far been discussed. The device is described fully in the next section under "Detailed Description of the Preferred Embodiment".

DETAILED DESCRIPTION OF THE PREFERRED EMBODIMENT

Figure 1:
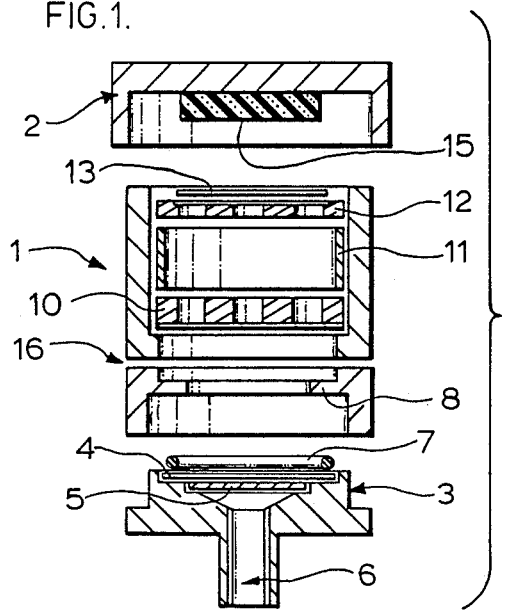
FIG. 1 is an exploded schematic design of the detecting device of the present invention.

FIG. 1 is an "exploded" diagram of the component parts of the detector head, shown in their assembled form in diagram 2.

A cylindrical body (1) is fitted at the top with an air-tight cap (2), and at the lower end, a base unit (3). The base unit carries a filter disc (4) resting on a support (5). The area below the filter area connects with the pumping stem (6). An "O" ring (7) acts as an air seal when compressed by the lower face of the shoulder (8) when the body is fitted to the base. The upper shoulder (9) in the bore of the body carries the collimator assembly (see also diagram 4) consisting of a bottom disc (10) which has a number of holes drilled in it, a spacer tube (11), and a top disc (12) drilled in the same manner as (10), and having a recess in the upper surface into which is fitted the detector (13). The lower collimator disc (9) has a thin plastic film (14) across the lower surface. The body unit (1) has a number of holes (16) drilled radially through the lower part between the shoulders (8) and (9). The detector and collimator assemblies are held in place by pressure from the resilient foam pad (15) attached to the lower surface of the cap.

MODE OF OPERATION

Air enters the body unit through the holes (16), passes through the filter paper (4) and support (5), and exits to the pump via the pumping stem (6). Radon progeny, attached to aerosols, are deposited upon the filter paper, from which position the characteristic alpha particles are emitted. Alphas travelling towards the detector (13) must first pass through the thin plastic film (14). This film performs two functions:

(a) It reduces the kinetic energy of the alpha particles to an optimum region for the chosen detector. The energy loss is determined by the thickness of the film-/absorber. See section (2)(a) above for details.

Figure 5A:
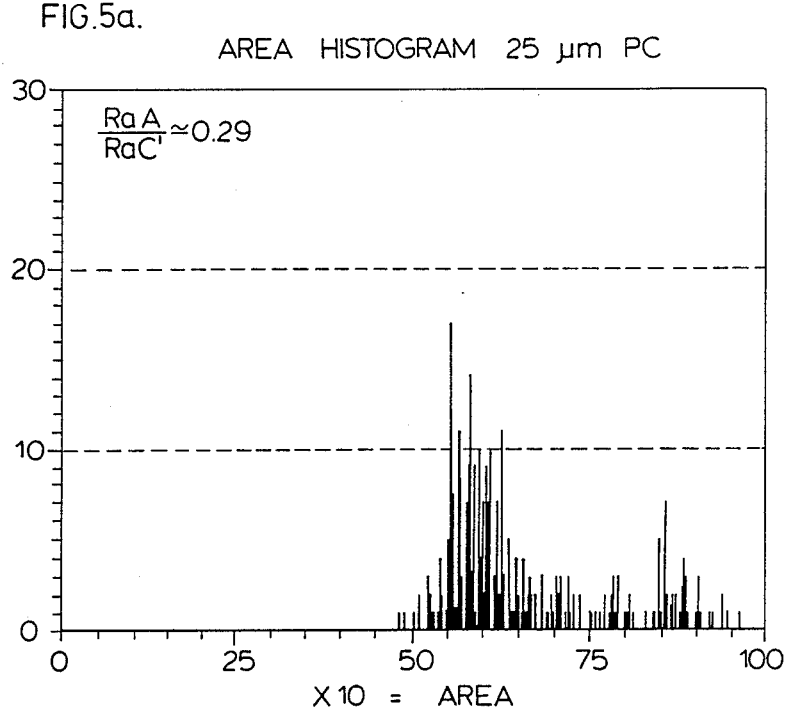
FIGS. 5a and 5b are two of the typical results expressed in terms of the area histogram plotted by a computer associated with the image analysis of the present invention. These figures illustrate results obtained when the multiple collimator embodiment of the present invention, with dimensions as described hereinafter, was employed in a radon contaminated atmosphere.
Figure 5B:
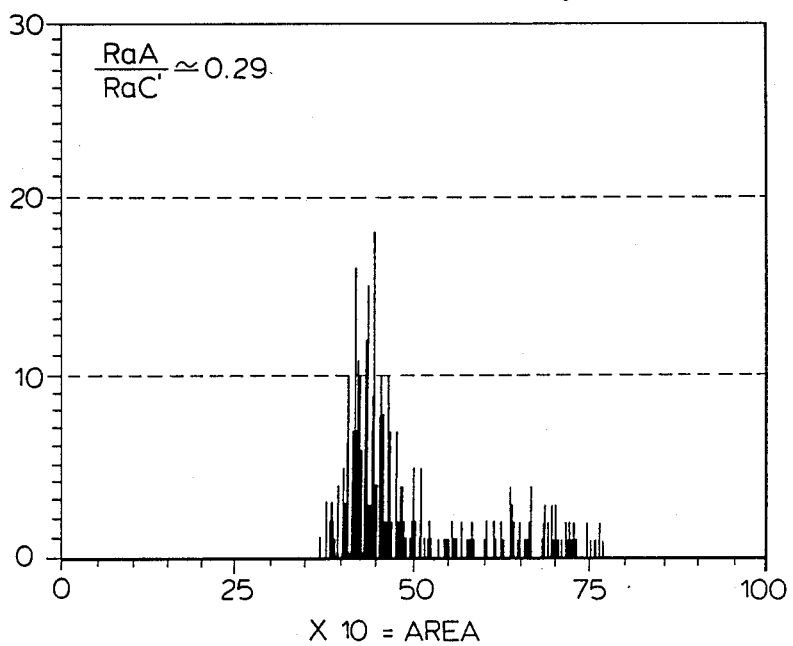

(b) It prevents radioactive contamination from entering the upper part of the assembly and causing spurious tracks to be registered. Having passed through the film, the attenuated alphas can reach the detector only after having passed through the holes in the lower and upper collimator discs. This process reduces the number of oblique tracks registered, thereby increasing the accuracy of measurement. The areas of the detector screened off by the solid part of the upper disk give a non-exposed or "background" area, and the track density figure for this area is subtracted from that of the exposed area to give greater accuracy. At the end of the exposure period, the detector is etched to emphasize the alpha tracks, and a track count is carried out by means of a commercial track counter (image analysis system). In time the discrimination between RaA and RaC' is required, automatic read-out and discrimination can be achieved by following the design feature described in (2) of the last paragraph. FIGS. 5a and 5b are two of the typical results expressed in terms of the area histogram plotted by the computer associated with the image analysis. The first peak (more abundant) is for the number of tracks of RaC' whereas the second peak is that of RaA. In FIG. 5a, the thickness of the absorber (film 14) used is 20 $\mu$m of polycarbonate while that in FIG. 5b is 25 $\mu$m. Both give the same results for the working level and the ratio RaA/RaC'. Therefore the optimum thickness of film 14 is not critical. The detecting head adopted for the above test is designed under the multiple collimator concept which will be described in detail below. The dimension of the testing head is the same as is quoted in the Table on page 23 under the line "multiple".

The concept of multiple collimators will now be presented with references made to FIGS. 2a, 2b, 3a and 3b. In order to demonstrate how the new concepts work, a practical example is given below and compared with the geometry adopted for the single collimator system. The purpose of a collimator is to limit the incident angle of alpha particles to a detector. Normal incidence is the ideal condition. The limit of the incident angle $\theta$ is defined by the ratio of collimator width (2R) and depth (2H), $$\theta = \tan^{-1}\frac{R}{H} \text{ where,}$$

R = the radius of the opening on Disk 4 or 6, and
H = half of the the height of the collimator.

At fixed $\theta$, for each value of R, there will be a corresponding value of air gap distance HT (see FIG. 2b); that is the distance between the detector and the filter, having the same geometric efficiency per unit area of detector. To reduce HT, H must be diminished. This results in decreasing R. To keep the same total geometric efficiency $E_G$, the total detector area must remain the same.

A decrease in R, which results in smaller detector areas for each collimator can be compensated for by using more collimators. This is the concept of the first advantageous employment of multiple collimators.

The second advantage of the multiple collimator is the improvement of the overall detecting efficiency. The overall detecting efficiency E can be expressed as a product, $E=E_G \times E_d$, where $E_d$ is the factor representing the density of the alpha-emitters on the filter paper. This is because a shorter air gap distance allows a smaller filter paper area. For the same flow rate, $E_d$ will increase as a consequence of a smaller filter paper area. In this regard, compare FIGS. 2a and 2b with FIGS. 3a and 3b.

Figure 2A:
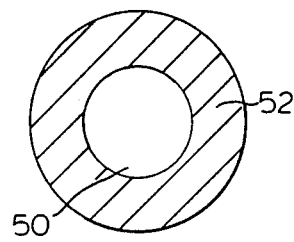
FIG. 2a is a diagrammatic top plan view and FIG. 2b is a side diagrammatic view of a single collimator/filter system.
Figure 2B:
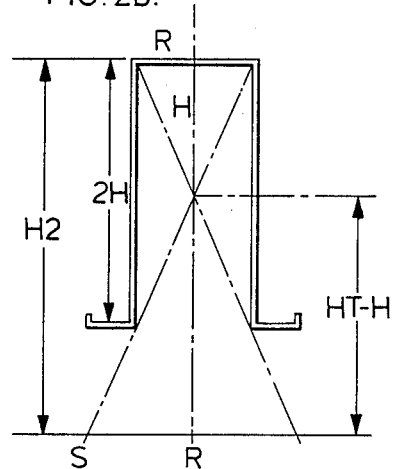
Figure 3A:
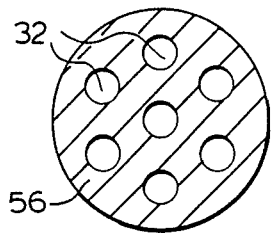
FIG. 3a is a diagrammatic top plan view of the upper disk (4) of the present invention and FIG. 3b is a side diagrammatic view of a multiple collimator/filter system.
Figure 3B:
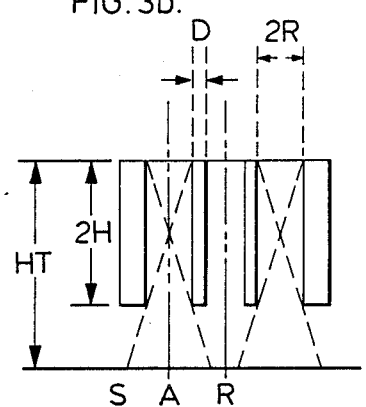
Figure 4:
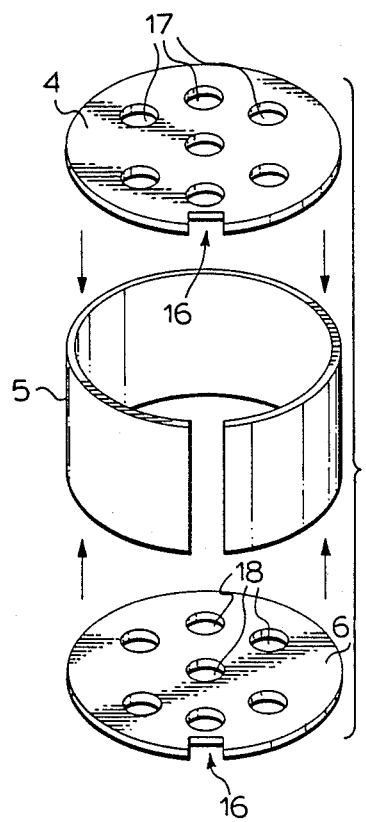
FIG. 4 is a schematic view of the collimator system of the present invention.

FIG. 2a shows a detector area (50) axially superposed over a filter area (52). The radius of (52) is given by RS as indicated in FIG. 2b. FIG. 3a illustrates seven detector areas (32), one for each collimator, superposed over a filter area (56). Similarly, the radius of (56) is also given by RS as indicated in FIG. 3b. FIG. 2a represents a single cell collimator while FIG. 3a represents the system using multiple collimators. As an example, for the same limit of incident angle and geometric efficiency, the dimensions of the two designs are tabulated as:

| Types of Collimator | R(cm) | H(cm) | HT(cm) | A (area of detector in cm$^2$) |
|---|---|---|---|---|
| Single | 0.3 | 0.65 | 2.2 | 0.28 |
| Multiple | 0.113 | 0.246 | 0.69 | 0.28 (total detector corresponding to 7 collimators) |

For FIGS. 2a and 2b, the following calculations apply, wherein RS is the radius of the filter and R is the radius of the detector.

$$RS = R(HT - H)/H$$
$$= 0.715$$

$$\text{Area of detector} = \pi R^2 = 0.28 \text{ cm}^2$$

$$\text{Area of filter} = \pi (RS)^2 = 1.61 \text{ cm}^2$$

For FIGS. 3a and 3b, the following calculations apply:

$$RS = R(HT - H)/H + 2R + D$$
$$= 0.48 \text{ cm.}$$

Here D is the distance between two consecutive collimators.

$$\text{Area of each detector} = \pi R^2 = 0.040 \text{ cm}^2$$

$$\text{Total area of detectors} = 7 \times 040 \text{ cm}^2\ 0.28 \text{ cm}^2$$

$$\text{Area of filter paper} = \pi (RS)^2 = 0.72 \text{ cm}^2$$

Decreasing the filter paper area leads to an increase in the density of the radon daughter deposition $E_d$ assuming the flow rate to be constant. With the same $E_G$ and a higher $E_d$, the overall detecting efficiency of the multi-collimator will thus be higher than that of the single collimator system.

The area of the filter using multiple collimators is 0.72 cm$^2$ compared to 1.61 cm$^2$ of the filter in the single collimator system of the same geometric efficiency. As a consequence, the increased $E_d$ results in an overall detection efficiency increase of 224%. This will reduce the pump flow rate requirement from 60 to 27 liters per hour. Reducing the pump flow rate reduces the pump size and power requirements, thereby greatly facilitating field use of the device.

The reduction of the air gap not only makes the detecting system more compact and less expensive to produce, but also provides a means of overcoming the previously-mentioned problem of erroneous results due to uranium dust contamination. In the prior art CEA system, tracks due to alphas from the plateout of uranium dust in the vicinity of the absorber are indistinguishable from those of RaA. This is due to the use of a very thin absorber which is necessary due to the long air path in that prior art CEA design. In the case of the multiple collimator system of the present invention, the air path is very short, allowing the use of a much thicker absorber which can be selected so that none of the uranium dust alphas are registered.

Figure 6:
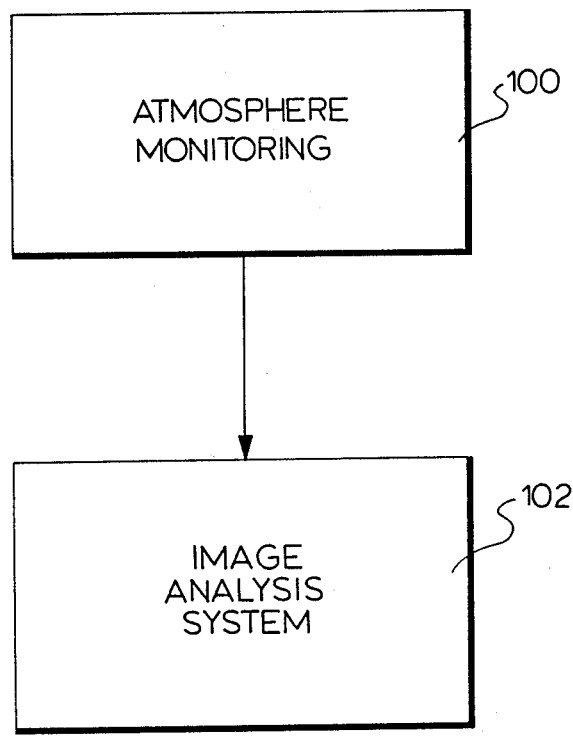
FIG. 6 is a schematic diagram showing the sensing instrument in combination with an image analysis system.

In FIG. 6 the detecting head and associated equipment has been designated 100, Atmosphere Monitoring. Once the detector has been suitably exposed, it is processed by the Image Analysis System 102. The results of the test can be plotted as shown in FIG. 5.

The dosimeter of the present invention may be manufactured entirely of plastic material, thereby enabling the device to be disposable due to the very low ratio of device cost to total service cost.

While a detailed description of the preferred embodiment has been given above, it is to be understood that the scope of the present invention is not to be limited thereby, but is to be determined by the claims which follow.

What is claimed is:

1. A method for selectively detecting alpha particles which comprises:
sampling air through a filter which retains alpha emitting aerosols;
positioning a plurality of collimators adjacent to the filter such that alpha particles emitted by aerosols in the filter are directed to a detector which is positioned at the opposite ends of the collimators, each collimator having an inlet port at the end nearest to the filter and an exit port at the end nearest to the detector; and
providing said detector, positioned adjacent to the collimators' exit ports, possessing such properties that alpha particles corresponding to the respective energies of the alpha emissions of radium A and radium C' are selectively detected by each collimator.

2. The method as claimed in claim 1, wherein said plurality of collimators comprise an upper disc with apertures therein, a spacer, and a lower disc with apertures therein, said upper disc, lower disc and spacer being removable, each collimator being defined by one of said apertures in said lower disc and one of said apertures in said upper disc.

3. An instrument as claimed in claim 1 wherein substantially the entire instrument, except for the detector, is made of plastic.

4. A method for selectively detecting alpha particles emitted simultaneously by radium A and radium C', which are derived from radon, which comprises:
sampling air though a filter which retains alpha-emitting aerosols;

positioning at least one collimator adjacent to the filter such that alpha particles emitted by aerosols in the filter are directed to a detector positioned at the opposite ends of the collimator, each collimator having an inlet port at the end nearest to the filter and an exit port at the end nearest to the detector;

providing said detector, positioned adjacent to the collimator's exit port, possessing such properties that alpha particles corresponding to the respective energies of the alpha emissions of radium A and radium C′ are selectively detected;

providing an absorber disposed on one of the ports of the collimator, said absorber having a uniform thickness; and providing a means for reading said detector, said means adapted to differentiate the alpha particles emitted from radium A and radium C′.

5. The method as claimed in claim 4 wherein the absorber is disposed on the inlet port of the collimator.

6. The method as claimed in claim 4 wherein the absorber is disposed on the outlet port of the collimator.

7. A method as claimed in claim 4 further comprising providing an enhancing means for enhancing the energy difference between the radium A and radium C′ particles passing through the absorber.

8. The method as claimed in claim 7 wherein the enhancing means provided is the absorber.

9. The method as claimed in claim 4 wherein the means for reading the detector comprises an image analysis system adapted to differentiate alpha emitters of different energies by the different size images the respective alpha particles leave on the detector.

10. The method as claimed in claim 4 wherein the absorber provided is a polycarbonate absorber.

11. The method as claimed in claim 4 wherein the thickness of the absorber is selected such that alpha particles from uranium dust cannot be registered by the detector.

12. The method of claim 4 wherein the collimator provided is composed of a plastic material so that it is disposable.

13. The method of claim 4 further comprising:

providing an inner cap retaining the detector and the absorber;

providing an externally-threaded outer cap contacting and retaining the inner cap and threaded to an internally-threaded case, which is also provided;

providing an inlet aperture in the case, disposed longitudinally between the filter and the detector, for enabling entry of air to be sampled into the instrument provided;

providing a filter support contacting and supporting the filter;

providing an exit port in the case located downstream of the filter for the exit of sampled air.

14. A method as claimed in claim 4 wherein seven collimators are provided.

15. A method as claimed in claim 14 wherein the collimators are provided such that the sum of the cross-sectional area of the bores of the collimators equals between 0.26 $cm^2$ to 0.30 $cm^2$ and wherein the length of each collimator provided equals between 0.45 cm to 0.54 cm and wherein the distance between the filter and the end of each collimator closest to the filter is between 0.18 cm and 0.22 cm.

16. The method of claim 15 wherein the total detection area provided is between 0.25 $cm^2$ and 0.31 $cm^2$.

17. An instrument for selectively detecting alpha particles emitted simultaneously by radium A and radium C′, which are derived from radon, comprising:

means for sampling air through a filter which retains alpha-emitting aerosols;

a detector in which the alpha particles corresponding to the respective energies of the alpha emissions of radium A and radium C′ are selectively detected;

at least two collimators positioned between the filter and the detector such that said collimators direct the alpha radiation from the aerosols collected by said filter to said detector, each collimator having an inlet port at the end nearest to the filter and an exit port at the end nearest to the detector, with each collimator designed to perform the same function;

an absorber disposed between the detector and the exit ports of the collimators, the absorber having a uniform thickness and being adapted to enhance the energy difference between radium A and radium C′ particles;

and including means for reading the detector comprising a computer controlled image analysis system adapted to differentiate alpha emitters of different energies by the different size images the respective alpha particles leave on the detector; said detector and said collimators comprising a detecting head, the detecting head being composed of a plastic material and being removable so that it is disposable; said instrument further comprising an inner cap retaining the detector and the absorber, an externally-threaded outer cap containing and retaining the inner cap and threaded to an internally-threaded case, an inlet aperture in the case disposed longitudinally between said filter and the detector for enabling entry of air to be sampled into the instrument, a filter support contacting and supporting the filter, an exit port located downstream of the filter for exit of sampled air; said instrument being further adapted such that the sum of the area of the bores of the collimators equal 0.28 $cm^2$ plus or minus 10 percent and the length of each collimator equals 0.492 cm plus or minus 10 percent, with the distance between the filter and the end of each collimator closest to the filter being 0.2 cm, plus or minus 10 percent.

18. A method for selectively detecting alpha particles emitted simultaneously by radium A and radium C; which are derived from radon, wherein said method comprises the steps of:

sampling air through a filter which retains alpha-emitting aerosols;

providing a detector in which the alpha particles corresponding to their respective energies of the alpha emissions of radium A and radium C′ are selectively detected;

providing at least two collimators, each for the same function, the function being to limit the incident angle of alpha particles directed toward the detector;

tracking the particles on the detector; and detecting the tracks of the particles of radium A and radium C′ in each collimator.

19. A method according to claim 18 further comprising the step of enhancing the energy difference between RaA and RaC′ particles using an absorber and wherein the step of detecting the particles comprises detecting the particles by the different size images the respective alpha particles leave on the detector using an image analysis system wherein measurements of track diameter are automatically carried out by a standard means.

20. The method of claim 19 wherein the collimators provided comprise a plurality of spacers and discs with apertures therein, said spacers and discs being of various thicknesses and being removable such that the detecting geometry may be flexibly changed.

21. The method of claim 20 wherein the collimators provided are composed of a plastic material such that it is disposable.

22. The method of claim 21 further providing for reading said detector, performing an indirect image diameter determination using area measurement of the images on the detector.

23. The method of claim 18 further providing for reading said detector, performing an indirect image diameter measurement using area measurement of the images on the detector.

24. The method of claim 23 wherein the means provided for reading said detector comprises defining the areas of the detector screened off by the solid parts of the collimator, which areas comprise the non-exposed background area, and subtracting the track density figure for this area from the track density figure of the exposed area, resulting in greater accuracy.

25. The method as claimed in claim 18 wherein the collimator includes an absorber formed of a mylar.

26. An instrument for selectively detecting alpha particles wherein said instrument comprises in combination:
   a device for sampling air through a filter which retains alpha-emitting aerosols;
   a detector in which the alpha particles corresponding to the respective energies of the alpha emissions of radium A and radium C' are selectively detected;
   at least two collimators placed between the filter and the detector such that said collimators direct the alpha radiation from the aerosols collected by said filter to said detector and the area of said detector exposed at each collimator is effectively used for detecting both radium A and radium C'.

27. An instrument as claimed in claim 26 further comprising a means for reading the detector, said means adapted to differentiate the alpha particles emitted from radium A and radium C'.

28. An instrument as claimed in claim 27 wherein the means for reading the detector comprises an image analysis system adapted to differentiate alpha emitters of different energies by the different size images the respective alpha particles leave on the detector.

29. An instrument as claimed in claim 28 wherein the means provided for reading the detector further comprises means for performing an indirect image diameter determination using area measurement of the images on the detector.

30. An instrument as claimed in claim 28 wherein the means provided for reading said detector further comprises defining the areas of the detector screened off by solid parts of the collimator, which areas comprise the non-exposed background area, and subtracting the track density figure for this area from the track density figure of the exposed area, resulting in greater accuracy.

31. An instrument as claimed in claim 26 further comprising an absorber disposed on one of the parts of the collimators, said absorber having a uniform thickness.

32. An instrument as claimed in claim 31 wherein said absorber possesses such physical properties that it enhances the energy difference between the radium A and radium C' particles passing through the absorber.

33. An instrument for selectively detecting alpha particles emitted simultaneously by radium A and radium C' which are derived from radon, wherein said instrument comprises in combination:
   a device for sampling air through a filter which retains alpha-emitting aerosols;
   a detector in which the alpha particles corresponding to the respective energies of the alpha emission of radium A and of radium C' are selectively detected;
   at least one collimator placed between the filter and the detector such that said collimators direct the alpha radiation from the aerosols collected by said filter to said detector;
   an absorber disposed between the detector and exit ports of the collimator, the absorber having a uniform thickness and being adapted to enhance the energy difference between RaA and RaC' particles; wherein the collimators are each designed to perform the same function so that the length of each collimator is decreased while efficiency of the instrument is increased; further comprising means for reading the detector, said means adapted to differentiate the alpha particles emitted from radium A and radium C';
   and wherein the means for reading the detector comprises an image analysis system adapted to differentiate alpha emitters of different energies by the different size images the respective alpha particles leave on the detector; and wherein the thickness of the absorber is selected so that alphas from uranium dust cannot be registered by the detector; and wherein the detector and the collimators comprise a detecting head, the detecting head being composed of a plastic material so that it is disposable; wherein the collimators provided comprise a plurality of spacers and discs with apertures therein, said spacers and discs being of various thicknesses and being removable such that the detecting geometry may be flexibly changed.

34. An instrument for selectively detecting alpha emissions of radiums A and radium C' comprising:
   means for sampling air through a filter which retains alpha-emitting aerosols;
   a plurality of collimators each having an inlet port an an outlet port, with the inlet ports of said collimator being located adjacent to said filter such that alpha particles emitted by aerosols retained by said filter are directed to a common detector positioned adjacent the outlet ports of said collimators;
   an absorber associated with said collimators, said absorber being located intermediate said filter and said detector such that alpha particles emitted by aerosols and directed at said detector pass through said absorber;
   said absorber differentially reducing the kinetic energy of radium A and radium C' particles in a manner to increase the energy difference between RaA and RaC' particles;
   said detector being selected such that RaA and RaC' particles which passthrough said absorber are selectively distinguishable by means of area mode image track analysis whereby the net area of said detector exposed at the outlet ports of said collimators is effective for sampling both RaA and RaC'.

35. An instrument as claimed in claim 34, wherein said absorber is positioned across the inlet ports of said collimators.

36. An instrument as claimed in claim 34, wherein said detector is made of CR-39 polycarbonate.

37. An instrument as claimed in claim 36, wherein said absorber is positioned across the inlet ports of said collimators.

38. An instrument as claimed in claim 36, wherein said absorber is a polycarbonate film.

39. An instrument for use in selectively detecting alpha particles comprising:
- means for sampling air through a filter which retains alpha emitting aerosols;
- a plurality of collimators each having an inlet port and an outlet port, with the inlet ports located adjacent said filter;
- a detecting means for sensing and by means of image, analysis distinguishing between radium A and radium C', said detecting means being exposed to radiation leaving through said outlet ports;
- said plurality of collimators being defined by an upper disc with apertures therein defining said outlet ports, a spacer and a lower disc with apertures therein defining said inlet ports and aligned with the apertures of said upper disc.

40. A dosimeter assembly for detecting alpha particles comprising:
- a plurality of collimators each having an inlet port and an outlet port;
- a filter disposed adjacent said inlet ports through which air is passed and which retains alpha emitting particles contained in the air, said plurality of collimators being positioned to receive radiation emitted from the particles;
- absorbing means for reducing the kinetic energy of alpha emitting particles which pass through said collimators; and
- a detecting means associated with said outlet ports for receiving said alpha emitting particles;
- said plurality of collimators being defined an upper disc having a plurality of apertures therein defining said outlet ports, and a lower disc having a plurality of apertures therein aligned with said apertures of said upper disc and forming said inlet ports.

* * * * *